United States Patent
Wiggins

(10) Patent No.: US 6,929,176 B2
(45) Date of Patent: Aug. 16, 2005

(54) SELF-SERVICE TERMINAL

(75) Inventor: Timothy Wiggins, Perth (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/426,559

(22) Filed: Apr. 30, 2003

(65) Prior Publication Data

US 2003/0226888 A1 Dec. 11, 2003

(30) Foreign Application Priority Data

May 4, 2002 (GB) .............................................. 0210285

(51) Int. Cl.$^7$ .............................................. G06F 17/60
(52) U.S. Cl. ........................... 235/379; 235/382; 902/8
(58) Field of Search ............................... 235/379, 380, 235/382; 902/8, 14, 15; 705/42, 43; 345/706, 707 V, 708, 707–8

(56) References Cited

U.S. PATENT DOCUMENTS

| | | | |
|---|---|---|---|
| 5,752,239 A | * | 5/1998 | Coutts .......................... 705/26 |
| 6,169,555 B1 | | 1/2001 | Yamamoto |
| 6,539,400 B1 | * | 3/2003 | Bloomfield et al. ...... 707/104.1 |
| 6,552,729 B1 | * | 4/2003 | Di Bernardo et al. ....... 345/473 |
| 2002/0028704 A1 | | 3/2002 | Bloomfield et al. |

FOREIGN PATENT DOCUMENTS

| | | |
|---|---|---|
| EP | 0 756 226 A2 | 1/1997 |
| EP | 0 948 980 A2 | 10/1999 |
| EP | 1 026 607 A | 8/2000 |
| JP | 2000187738 A | 7/2000 |
| JP | 2001236137 A | 8/2001 |
| WO | WO 98/06043 A1 | 2/1998 |
| WO | WO 02/37471 A2 | 5/2002 |
| WO | WO 02 057896 A | 7/2002 |

* cited by examiner

*Primary Examiner*—Daniel Stcyr
(74) *Attorney, Agent, or Firm*—Gregory A. Welte

(57) ABSTRACT

A self-service terminal (12) is described. The terminal (12) may be an ATM, and has a user interface (30,34) comprising a synthetic character (84). The terminal (12) is coupled to a database (24) that includes information about users of the terminal (12). The terminal (12) is operable to present an adapted character to a user, where one or more aspects of the character (84) have been adapted to reflect changes in the user. A method of interacting with a user at a self-service terminal, and a self-service terminal system (10) are also described.

14 Claims, 5 Drawing Sheets

80

PLEASE SELECT A TRANSACTION

86 — TRANSFER CASH TO SAVINGS ACCOUNT?

- CASH WITHDRAWAL
- BALANCE REQUEST
- FUNDS TRANSFER

82

84 —

CANCEL

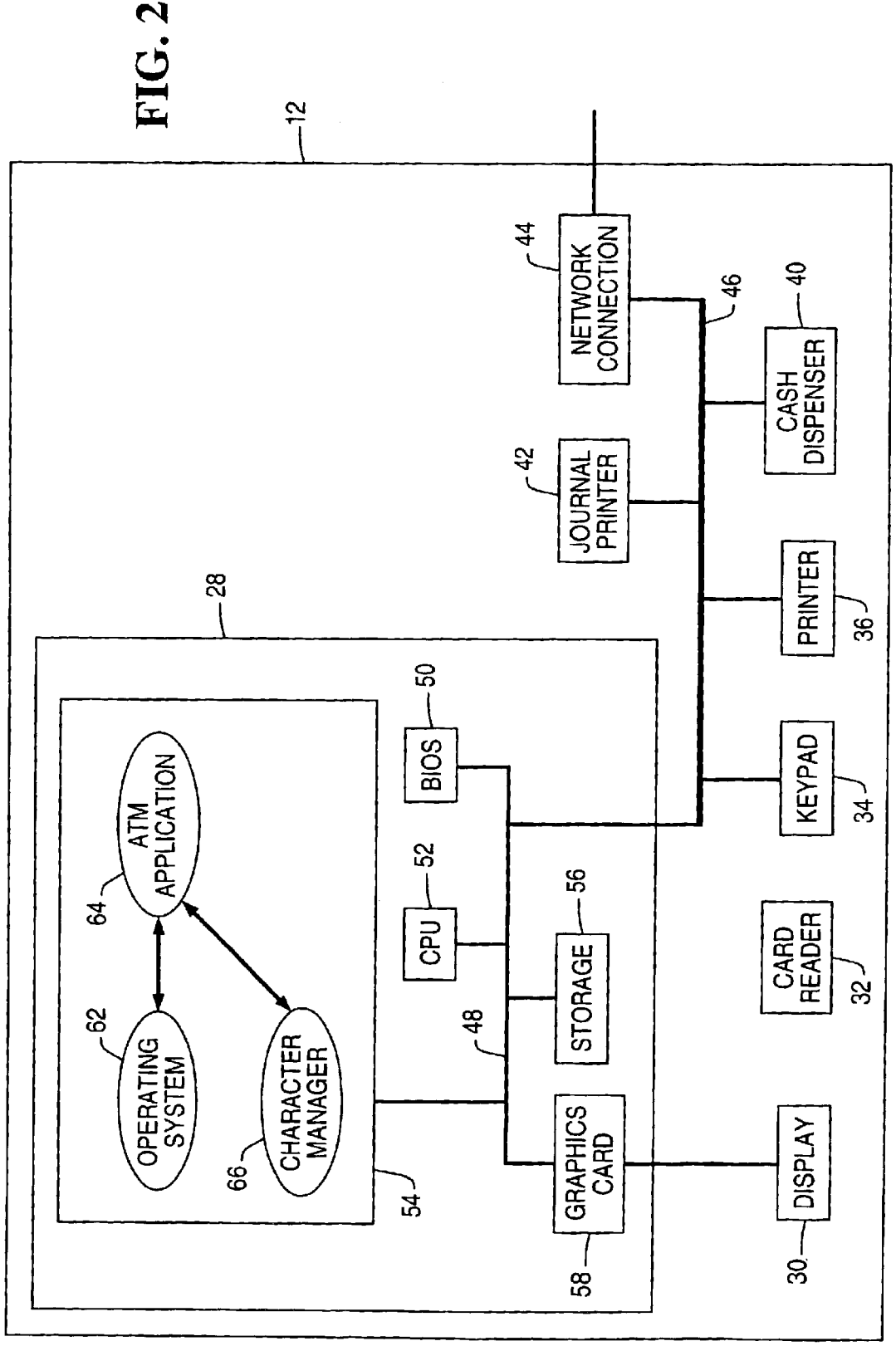

FIG. 3A

| CODE | PROGRAM |
|---|---|
| A1 | c:\dog.exe |
| A2 | c:\man.exe |
| A3 | c:\ynglady.exe |
| A4 | c:\teen.exe |
| A5 | c:\dog.exe |

FIG. 3B

| CODE | PROGRAM |
|---|---|
| B1 | c:\beh\inform.dll |
| B2 | c:\beh\form.dll |
| B3 | c:\beh\rel-pol.dll |
| B4 | c:\beh\friend.dll |
| B5 | c:\beh\abrupt.dll |

FIG. 3C

| CODE | PROGRAM |
|---|---|
| V1 | c:\voc\cartoon.dll |
| V2 | c:\voc\trmale.dll |
| V3 | c:\voc\yngfem.dll |
| V4 | c:\voc\ygmale.dll |
| V5 | c:\voc\boy.dll |

FIG. 3D

| CODE | PROGRAM |
|---|---|
| W1 | c:\wreg\high.dll |
| W2 | c:\wreg\med.dll |
| W3 | c:\wreg\r-low.dll |
| W4 | c:\wreg\low.dll |
| W5 | c:\wreg\foreign.dll |

SELF-SERVICE TERMINAL

BACKGROUND OF THE INVENTION

The present invention relates to a self-service terminal (SST), such as an automated teller machine (ATM). In particular, the invention relates to an ATM having a user interface including a synthetic character. The invention also relates to a synthetic character for a user interface of a computing device, such as an SST.

As the functions and services provided by computing devices increase, it is becoming more common for synthetic characters, such as cartoons, animated objects, and such like, to be provided as part of a user interface to a computing device.

Synthetic characters assist users by providing help that is tailored to the particular requirements and preferences of each user. However, once users become familiar with a particular user interface, a synthetic character may no longer be required to help the user. Furthermore, a user may tire of interacting with a synthetic character.

Some computing devices allow a user to change the appearance or behavior of a synthetic character; however, this involves time and effort on the part of the user, and many users prefer to inactivate the synthetic character rather than update its behavior and/or appearance.

SUMMARY OF THE INVENTION

It is among the objects of an embodiment of the present invention to obviate or mitigate the above disadvantages, or other disadvantages associated with prior art computing devices, such as SSTs.

According to a first aspect of the invention there is provided a self-service terminal having a user interface comprising a synthetic character, where the terminal is coupled to a database including information about users of the terminal, characterized in that the terminal is operable to present an adapted character to a user, where one or more aspects of the character have been adapted to reflect changes in the user.

The character's appearance may be adapted so that the character looks older or younger than previously; the character's appearance may be adapted to such an extent that the character's new visual appearance is radically different to the character's previous visual appearance. Thus, the character's appearance may change in an evolutionary manner (a large number of successive small changes) or in a revolutionary manner (a sudden large change).

The character's voice may be adapted, for example, by lowering the tone of the character's voice.

The character's vocabulary and/or diction and/or speech patterns may be adapted.

The character's movement or other motor skills may be adapted.

The personality adopted by the synthetic character may be adapted.

One or more of the above aspects of the character, or some other aspect of the character, may be adapted. Thus, the character may change visually, audibly, or both visually and audibly.

In a preferred embodiment, the character is adapted to the proficiency of the user, so that as a user becomes more proficient in using the terminal, the character offers more concise help to the user.

Preferably, the database is a customer relationship management (CRM) database.

The character may be adapted by the terminal. Alternatively, the character may be adapted by the database.

By virtue of this aspect of the invention, a user is able to interact with a synthetic character that is automatically updated over time to adapt to the user's preferences, traits, interests, or such like; thereby reducing the possibility of the user becoming weary of the appearance or behavior of the synthetic character.

According to a second aspect of the present invention there is provided a method of interacting with a user at a self-service terminal, the method comprising the steps of: identifying a user; identifying a synthetic character associated with the user; determining changes in the user's behavior; updating the synthetic character to reflect changes in the user's behavior; and presenting the synthetic character to the user to assist the user in conducting a transaction.

Changes in the user's behavior may be inferred from changes in the user's buying habits (for example, the types of goods or services the user buys, the amount of money the user spends, and such like), age, interaction with the SST, and such like.

According to a third aspect of the present invention there is provided a synthetic character for a user interface of a computing device, the synthetic character having an adaptable appearance or behavior, where the character is adapted to reflect changes in an associated user.

According to a fourth aspect of the present invention there is provided a self-service terminal system comprising a plurality of self-service terminals having user interfaces including synthetic characters, a host for authorizing transactions executed by users at the self-service terminals, and a database for storing information about the users, where the system is operable to adapt one or more aspects of a synthetic character to reflect changes in an associated user, so that a user's synthetic character changes with the user over time.

According to a fifth aspect of the invention there is provided a self-service terminal having a user interface comprising a synthetic character, where the terminal is coupled to a database including information about users of the terminal, characterized in that the terminal is operable to adapt one or more aspects of the character to reflect changes in the user, so that as a user changes over time, the synthetic character also changes.

BRIEF DESCRIPTION OF THE INVENTION

These and other aspects of the present invention will be apparent from the following specific description, given by way of example, with reference to the accompanying drawings, in which:

FIG. 2 is a simplified block diagram of the architecture of one of the self-service terminals of FIG. 1;

FIGS. 3a to 3d are four tables containing synthetic character information;

DETAILED DESCRIPTION

Figure 1:
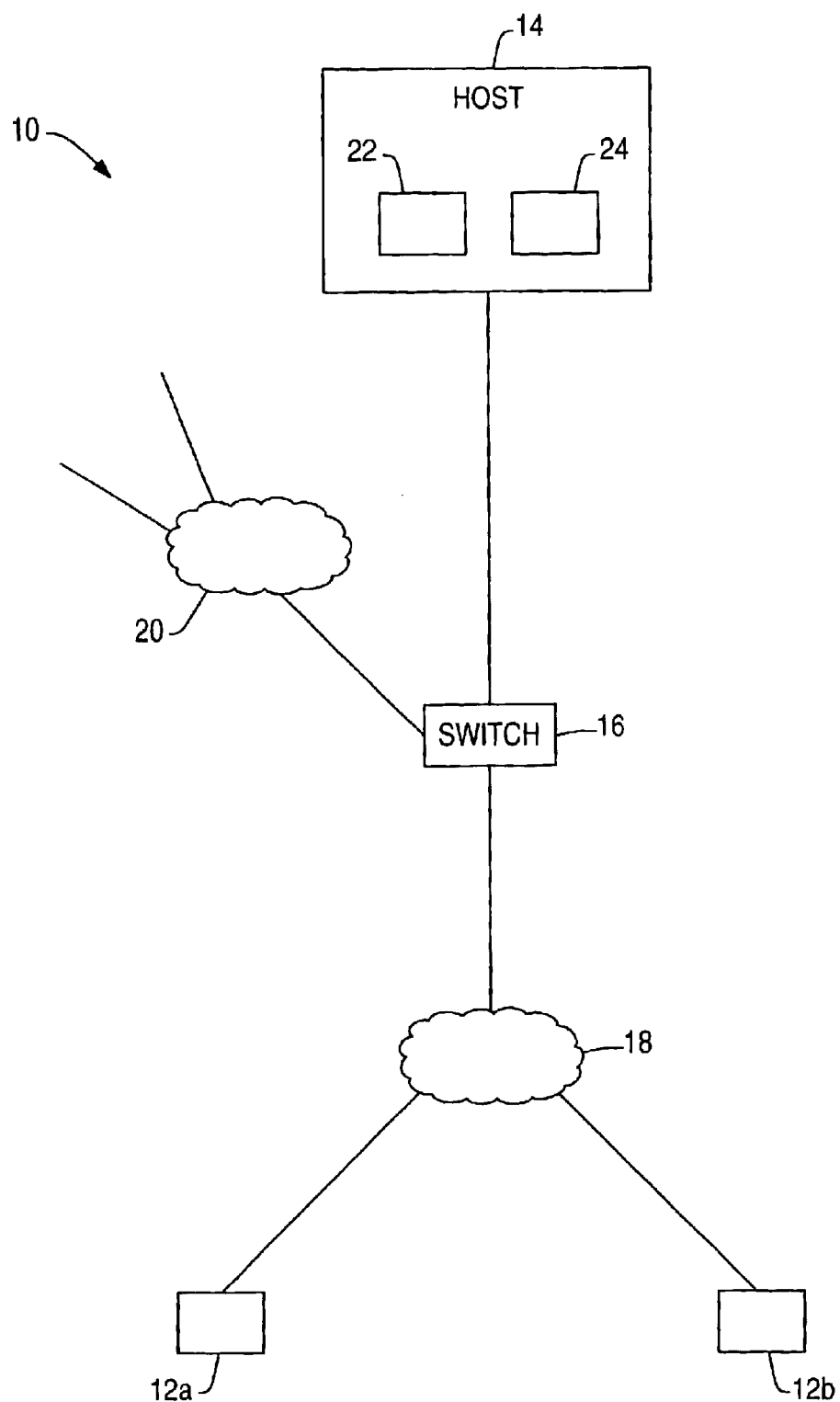
FIG. 1 is simplified block diagram illustrating a self-service terminal system according to one embodiment of the present invention.

Reference is now made to FIG. 1, which is a simplified block diagram of an SST system 10, in the form of an ATM system, according to one embodiment of the present invention.

The ATM system 10 is owned and operated by a financial institution, and comprises a plurality of ATMs 12 (only two of which are shown in FIG. 1) connected to a host 14 via a transaction switch 16 and a secure network 18. The switch 16 is also connected to interchange networks 20 to route authorization requests to authorization centers (not shown) operated by other financial institutions and financial services companies.

The host 14 includes an authorization facility 22 for authorizing transactions from an account held by an identified user, and a personalization database 24 for storing personalized information relating to the financial institution's account holders. The host 14 may also include other facilities, such as a card services facility.

Reference is now made to FIG. 2, which is a block diagram illustrating one of the ATMs 12 in more detail. Each ATM 12 comprises a plurality of modules for enabling transactions to be executed and recorded by the ATM 12. These ATM modules comprise: a controller module 28, a display module 30, a card reader/writer module 32, an encrypting keypad module 34, a receipt printer module 36, a cash dispenser module 40, a journal printer module 42 for creating a record of every transaction executed by the ATM 12, and a network connection module 44 (in the form of a network card) for accessing the host 14 (FIG. 1). The display 30 and keypad 34 are the primary user interface elements on the ATM 12.

The controller 28 comprises a BIOS 50 stored in non-volatile memory, a microprocessor 52, associated main memory 54, storage space 56 in the form of a magnetic disk drive, and a display controller 58 in the form of a graphics card.

The display module 30 is connected to the microprocessor 52 via the graphics card 58 installed in the controller module 28 and one or more internal controller buses 48. The other ATM modules (32 to 44) are connected to the ATM controller 28 via a device bus 46 and the controller buses 48.

When the ATM is powered up, a secure booting-up process is performed. During the boot-up process, the main memory 54 is loaded with an ATM operating system kernel 62, an ATM application 64, and a synthetic character manager application 66 in a secure manner. Furthermore, the ATM modules (30 to 44) and other components (50,56,58) are authenticated.

As is well known in the art, the operating system kernel 62 is responsible for memory, process, task, and disk management. The ATM application 64 is responsible for controlling the operation of the ATM 12. In particular, the ATM application 64 provides the sequence of screens used in each transaction (referred to as the transaction flow); monitors the condition of each module within the ATM (state of health monitoring); and obtains authorization for transactions from the remote transaction authorization facility 22 (FIG. 1) in host 14 (FIG. 1).

The term "screen" is used herein to denote the graphics, text, controls (such as menu options), and such like, that are presented on an SST display; the term "screen" as used herein does not refer to the hardware (that is, the display) that presents the graphics, text, controls, and such like. Typically, when a transaction is being entered at an SST, a series of screens are presented in succession on the SST display, the next screen displayed being dependent on a user entry or activity relating to the current screen. For example, a first screen may request a user to insert a card; once a card has been inserted a second screen may invite the user to enter his/her PIN; once the final digit of the PIN has been entered, a third screen may invite the user to select a transaction; and so on.

The synthetic character manager 56 is used to access the personalization database 24 (FIG. 1) via network connection 44. The synthetic character manager 56 stores a plurality of tables, which may be downloaded to the ATM 12 from the host 14. FIGS. 3a to 3d illustrate four of these tables.

FIG. 3a is a character type table 100 having two columns 102, 104. A code column 102 stores a unique identification code associated with each type of character. A program column 104 stores a link to a program for a type of character associated with the corresponding code in the code column 102. For example, in FIG. 3a, identification code "A1" represents a cartoon dog, code "A2" represents a middle aged man, code "A3" represents a young lady, code "A4" represents a teenage boy, and so on. The program associated with each type of character can be instantiated by the character manager 56 to present the character on the ATM's display 30.

FIG. 3b is a behavior type table 110 having two columns 112, 114. A code column 112 stores a unique identification code associated with each type of behavior. A program column 114 stores a link to a routine that can be called by an instantiated character type program. For example, in FIG. 3b, identification code "B1" represents relatively informal, code "B2" represents formal, code "B3" represents relaxed but polite, code "B4" represents friendly, and so on.

FIG. 3c is a voice type table 120 having two columns 122, 124. A code column 122 stores a unique identification code associated with each type of voice. A program column 124 stores a link to a routine that can be called by an instantiated character type program. For example, in FIG. 3c, identification code "V1" represents a cartoon voice, code "V2" represents a traditional male voice, code "V3 " represents a young female voice, code "V4" represents a young male voice, and so on.

FIG. 3d is a word register table 130 having two columns 132, 134. A code column 132 stores a unique identification code associated with each type of voice. A program column 134 stores a link to a routine that can be called by an instantiated character type program. For example, in FIG. 3d, identification code "W1" represents a high word register including a large vocabulary, code "W2" represents a medium word register including a more limited vocabulary than that of level "W1", code "W3" represents a relatively low word register, code "W4" represents a low word register with a simple limited vocabulary, and so on.

Figure 4:
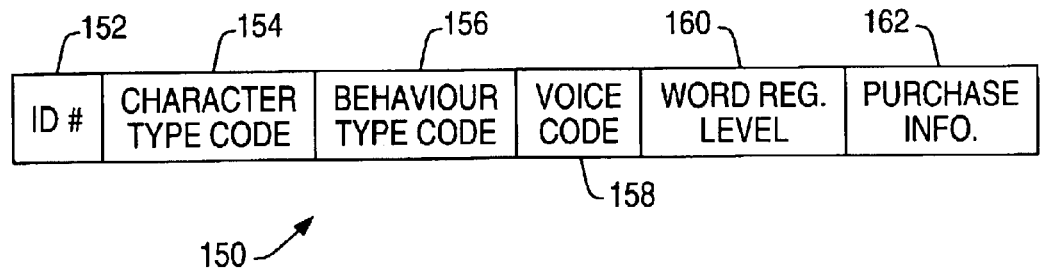
FIG. 4 is a table illustrating an entry in part of the system (the database) of FIG. 1.

FIG. 4 is a part of a user table 150 illustrating a typical entry in the database 24. Each entry in the user table 150 has a plurality of fields, including a user identification field 152, a character type field 154, a behavior type field 156, a voice type field 158, a word register field 160, and a purchasing information field 162. The database 24 may include additional fields.

The user identification field 152 stores the card number of the user's ATM card. The character type field 154 stores a unique identification code corresponding to a type of synthetic character. The behavior type field 156 stores a unique identification code corresponding to a type of behavior to be exhibited by the synthetic character identified by field 154. The voice type field 158 stores a unique identification code corresponding to a type of voice belonging to the synthetic character identified by field 154. The word register field 160 stores a unique identification code corresponding to a word register used by the synthetic character identified by field 154. The purchasing information field 162 stores information about purchasing habits of the user.

Figure 5:
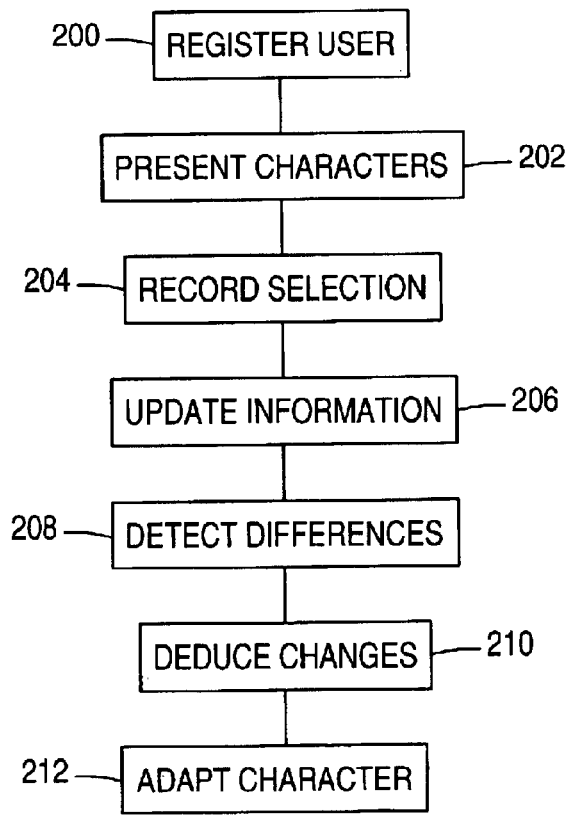
FIG. 5 is a flowchart illustrating the operation of part of the system (the database) of FIG. 1.

The operation of the system 10 will now be described with reference to FIGS. 1 to 4, and also with reference to FIG. 5, which is a flowchart illustrating the operation of the personalization database 24.

Initially, a user is registered (step 200) with the financial institution and the user gives permission to the institution to store information in the personalization database 24 about his/her purchases. The personalization database 24 incorporates a customer relationship management (CRM) system. CRM systems are well-known in the art. Typically, the database 24 also records Switch and/or credit card transactions performed by the user.

The user is then presented with various synthetic characters (step 202) and asked to select one. In this example, the user selects a cartoon dog (code "A1" in table 100). The user also selects the type of behavior (in this example, friendly behavior, which is code "B4" in table 110), the type of voice (in this example, a cartoon voice, which is code "V1" in table 120), and the word register (in this example, relatively low, which is code "W3" in table 130).

The database records these selections (step 204) in the appropriate fields (154 to 160) of a database entry that includes the card number of the user's ATM card in the user identification field 152.

The purchase information field 162 in the user's entry in the database 24 is continually updated with information about the user's purchases (step 206). The database continually examines this information to detect any differences or long term trends in the user's purchasing habits (step 208).

The database 24 analyses these differences to deduce changes in the user's preferences, behavior, attitude, and such like (step 210). For example, if the user starts purchasing books regularly, then the database may deduce that the user's word register has increased.

The database 24 then adapts the user's character information (step 212) so that, when instantiated, the character more closely conforms to the new preferences or behavior of the user, as deduced by the database 24. In the above example, where the user purchases books regularly, the database 24 increases the word register level of the user's synthetic character from relatively low (code "W3") to medium (code "W2").

This procedure is continuous, so the database reverts to step 206 to examining and analyzing the user's behavior.

Figure 6:
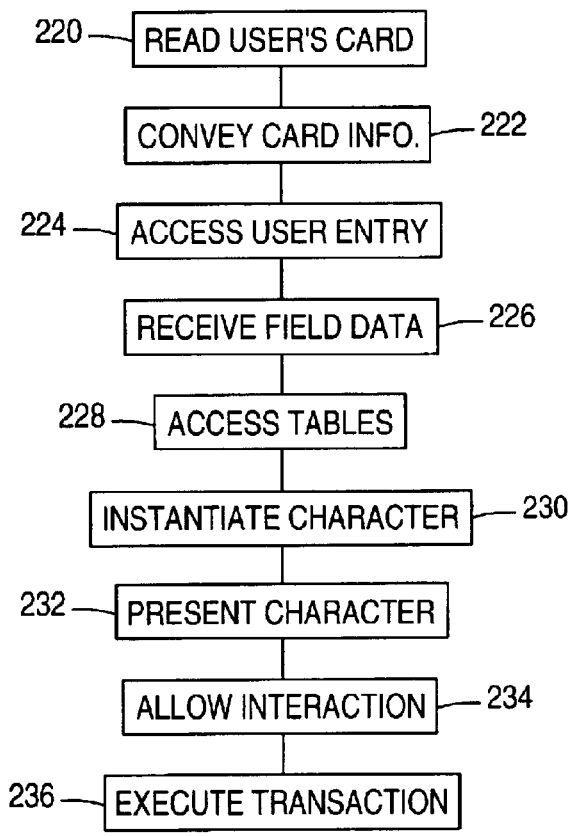
FIG. 6 is a flowchart illustrating the operation of the system of FIG. 1 during a transaction.

A typical transaction will now be described with reference to FIGS. 1 to 5, and also with reference to FIG. 6, which is a flowchart illustrating the operation of the system 10 during a transaction.

Initially, a user enters his/her card into the card reader 32, which reads the card (step 220) and conveys the read information (step 222) to the ATM application 64 and the character manager 66.

While the ATM application 64 is using the read data to prepare transaction screens, the character manager 66 immediately accesses the personalization database 24 (via the network card 44) using the user's ATM card number and retrieves synthetic character information for that character (step 224). This is implemented by the database 24 using the read card number to access the user's entry in the user table 150 (FIG. 4).

The database 24 then sends the codes from the character type field 154, the behavior type field 156, the voice type field 158, and the word register field 160 to the character manager program 66. This occurs very quickly as only a few bytes of data are transferred.

When the character manager program 66 receives the code data (step 226), the program 66 uses the received codes to access (step 228) the stored tables 100,110,120,130 and instantiate (step 230) a synthetic character having an appearance, attributes, and behavior appropriate for the user (as defined by the received code data). The controller 28 presents (step 232) the instantiated synthetic character to the user, and allows the user to interact (step 234) with the synthetic character, if desired, to enter a transaction.

When the user has entered a transaction, the ATM executes the transaction (step 236) by authorizing the transaction, ejecting the card for the user to remove, and dispensing any media required to fulfil the transaction.

Figure 7:
FIG. 7 is a pictorial view of a screen presented during a transaction executed by the system of FIG. 1.

Reference is now made to FIG. 7, which is a pictorial view of a screen 80 presented on display 30 during a transaction executed by the system of FIG. 1, for example, at step 232. The screen 80 shows three transaction options 82 and a synthetic character 84 providing advice and information to the user. In screen 80 the synthetic character 84 suggests that the user may wish to transfer money from his/her current account to a savings account to earn extra interest. This suggestion is illustrated by a text bubble labeled 86, although the suggestion may be spoken by the character 84.

If the user does not like the new attributes (for example, the appearance, behavior, voice, or word register) of the synthetic character 84, then the user can over-ride the changes so that the synthetic character 84 reverts to its previous attributes. The user may be able to implement this change at the ATM 12, or may be able to implement the change by accessing the database 24 via a telephone connection or a Web page.

It will now be appreciated that the above embodiment has the advantage that a synthetic character associated with a user can be updated automatically so that the synthetic character reflects changes in the user's personality, behavior, preferences, or such like.

It will be appreciated that although only one example has been given of a synthetic character being automatically adapted as a result of changes in a user, many other examples could be given. For example, if a new transaction is offered at a self-service terminal, then the terminal may provide full help for each stage of the transaction the first time that the user requests that transaction. However, the terminal may reduce the amount of help provided by the synthetic character after each successful completion of that transaction. This could be implemented by the ATM updating a proficiency field in the user's entry of the user table 150.

Furthermore, changes to the synthetic character may not be based on purchasing habits, some changes may be based on age. For example, if a user is relatively young, for example, eleven years old and selects a cartoon character, then this may be changed automatically when the user becomes a teenager.

Changes to the synthetic character may be based on age but may differ depending on the gender of the user. For example, where the user is male, the synthetic character may exhibit an interest in sport when the user is aged between six and ten years; the character may exhibit an interest in sport and music when the user is a teenager; when the user is approximately twenty years old, the character may exhibit an interest in sport, music, and technology. Where the user is female, the synthetic character may exhibit an interest in animals when the user is aged between six and ten years; the character may exhibit an interest in music when the user is a teenager; when the user is approximately twenty years old, the character may exhibit an interest in fashion and music.

Various modifications may be made to the above described embodiment within the scope of the invention, for example, in other embodiments, the SST (rather than the database) may deduce changes to the synthetic character. In some embodiments, synthetic characters may be resident on the host 14, or some other server, and downloaded to a computing device when a user accesses that computing device.

It will be appreciated that the types of character, behavior, voice, and such like provided in the above embodiment are merely examples, and that many other types of attributes may be used.

The computing device described in the above embodiment is an ATM, but other types of SST may be used, such as information kiosks; or other types of computing devices may be used, such as pocket computers, personal computers, cellular radio-frequency telephones, personal digital assistants, entertainment systems, or such like.

What is claimed is:

1. A method of interacting with a user at a self-service terminal, the method comprising the steps of:
    identifying a user;
    identifying a synthetic character associated with the user;
    determining changes in the user's behavior;
    updating the synthetic character to reflect changes in the user's behavior; and
    presenting the synthetic character to the user to assist the user in conducting a transaction.

2. A method of interacting with a user at a self-service terminal, the method comprising the steps of:
    identifying a user;
    identifying a synthetic character associated with the user;
    determining changes in the user's behavior;
    updating the synthetic character's vocal qualities to reflect changes in the user's behavior; and
    presenting the synthetic character to the user to assist the user in conducting a transaction.

3. A method according to claim 2, wherein the synthetic character's vocal qualities include the character's voice.

4. A method according to claim 2, wherein the synthetic character's vocal qualities include the character's vocabulary.

5. A method according to claim 2, wherein the synthetic character's vocal qualities include the character's diction.

6. A method according to claim 2, wherein the synthetic character's vocal qualities include the character's speech patterns.

7. A method according to claim 2, further comprising the step of adapting the character's appearance based upon changes in the user's behavior so that the character looks older or younger than previously.

8. A method according to claim 2, further comprising the step of adapting the character to the proficiency of the user so that as a user becomes more proficient in using the terminal the character offers more concise help to the user.

9. A method according to claim 2, further comprising the step of allowing the user to revert to the previous version of the synthetic character's vocal qualities.

10. A self-service terminal system comprising:
    a plurality of self-service terminals having user interfaces including synthetic characters;
    a host for authorizing transactions executed by users at the self-service terminals;
    a database for storing information about the users; and
    means for adapting one or more aspects of a synthetic character to reflect changes in an associated user, so that a user's synthetic character changes with the user over time.

11. A terminal according to claim 10, wherein the database is a customer relationship management (CRM) database.

12. A self-service terminal having a user interface, the terminal comprising:
    means for providing a synthetic character;
    means for coupling to a database which includes information about users of the terminal;
    means for presenting an adapted character to a user based upon information from the database; and
    means for adapting the character to the proficiency of the user so that as a user becomes more proficient in using the terminal the character offers more concise help to the user.

13. A self-service terminal having a user interface, the terminal comprising:
    means for providing a synthetic character;
    means for coupling to a database which includes information about users of the terminal;
    means for presenting an adapted character to a user based upon information from the database, wherein the character's vocal qualities are adapted; and
    means for adapting the character to the proficiency of the user so that as a user becomes more proficient in using the terminal the character offers more concise help to the user.

14. A self-service terminal having a user interface, the terminal comprising:
    means for providing a synthetic character;
    means for coupling to a database which includes information about users of the terminal;
    means for presenting an adapted character to a user based upon information from the database, wherein the character's vocal qualities are adapted; and
    means for enabling the user to revert to the previous version of the synthetic character's vocal qualities.

* * * * *